(12) United States Patent
Xiao

(10) Patent No.: US 12,556,469 B2
(45) Date of Patent: Feb. 17, 2026

(54) TUNNEL BFD SESSION ESTABLISHMENT METHOD AND DEVICE

(71) Applicant: ZTE Corporation, Shenzhen (CN)

(72) Inventor: Min Xiao, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 577 days.

(21) Appl. No.: 18/018,676

(22) PCT Filed: Jul. 21, 2021

(86) PCT No.: PCT/CN2021/107713
§ 371 (c)(1),
(2) Date: Jan. 30, 2023

(87) PCT Pub. No.: WO2022/022366
PCT Pub. Date: Feb. 3, 2022

(65) Prior Publication Data
US 2023/0300048 A1    Sep. 21, 2023

(30) Foreign Application Priority Data
Jul. 30, 2020    (CN) .......................... 202010753186.3

(51) Int. Cl.
*H04L 43/0811*    (2022.01)
*H04L 12/46*    (2006.01)

(52) U.S. Cl.
CPC ...... *H04L 43/0811* (2013.01); *H04L 12/4633* (2013.01)

(58) Field of Classification Search
None
See application file for complete search history.

(56) References Cited

U.S. PATENT DOCUMENTS

2016/0211989 A1    7/2016  Jain et al.
2019/0342200 A1    11/2019 Juneja

FOREIGN PATENT DOCUMENTS

CN    101163060 A    4/2008
CN    102265568 A    11/2011
(Continued)

OTHER PUBLICATIONS

Translation of CN110875855A (Year: 2020).*
(Continued)

*Primary Examiner* — Angela Nguyen
(74) *Attorney, Agent, or Firm* — CANTOR COLBURN LLP

(57) ABSTRACT

A tunnel BFD session establishment method and device are provided. The tunnel BFD session establishment method includes: acquiring first content information, generating a first tunnel bidirectional forwarding detection (BFD) session establishment packet according to the first content information, and sending the first tunnel BFD session establishment packet to a second edge node; receiving a second tunnel BFD session establishment packet sent by the second edge node; and establishing a tunnel BFD session between the first edge node and the second edge node when the BFD status of the first edge node and the BFD status of the second edge node are a preset status. Therefore, the solution can solve a series of problems in the related art caused by that a tunnel BFD session can only be established by means of manual configuration, so as to achieve the effect of automatically establishing the tunnel BFD session.

18 Claims, 6 Drawing Sheets

A first edge network node acquires first content information, generates a first tunnel BFD session establishment packet according to the first content information, and sends the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field — S102

The first edge network node receives a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field — S104

A tunnel BFD session is established between the first edge node and the second edge node when the BFD status of the first edge node and the BFD status of the second edge node are a preset status — S106

(56) References Cited

FOREIGN PATENT DOCUMENTS

| CN | 102571497 | A |   | 7/2012  |            |
|----|-----------|---|---|---------|------------|
| CN | 104333872 | A |   | 2/2015  |            |
| CN | 107113221 | A |   | 8/2017  |            |
| CN | 107277058 | A |   | 10/2017 |            |
| CN | 107317753 | A |   | 11/2017 |            |
| CN | 107623607 | A |   | 1/2018  |            |
| CN | 108063718 | A |   | 5/2018  |            |
| CN | 109412926 | A |   | 3/2019  |            |
| CN | 110740094 | A |   | 1/2020  |            |
| CN | 110875855 | A | * | 3/2020  | H04L 43/0805 |
| CN | 112491638 | A |   | 3/2021  |            |
| WO | 2018010614 | A1 |  | 1/2018  |            |

OTHER PUBLICATIONS

European Search Report for Application No. 21850703.6, dated Nov. 23, 2023, 10 pages.
International Search Report for corresponding application PCT/CN2021/107713 filed Jul. 21, 2021; Mail date Sep. 28, 2021.

* cited by examiner

Fig. 7

| | |
|---|---|
| A first edge network node acquires first content information, generates a first tunnel BFD session establishment packet according to the first content information, and sends the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field | S102 |
| The first edge network node receives a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field | S104 |
| A tunnel BFD session is established between the first edge node and the second edge node when the BFD status of the first edge node and the BFD status of the second edge node are a preset status | S106 |

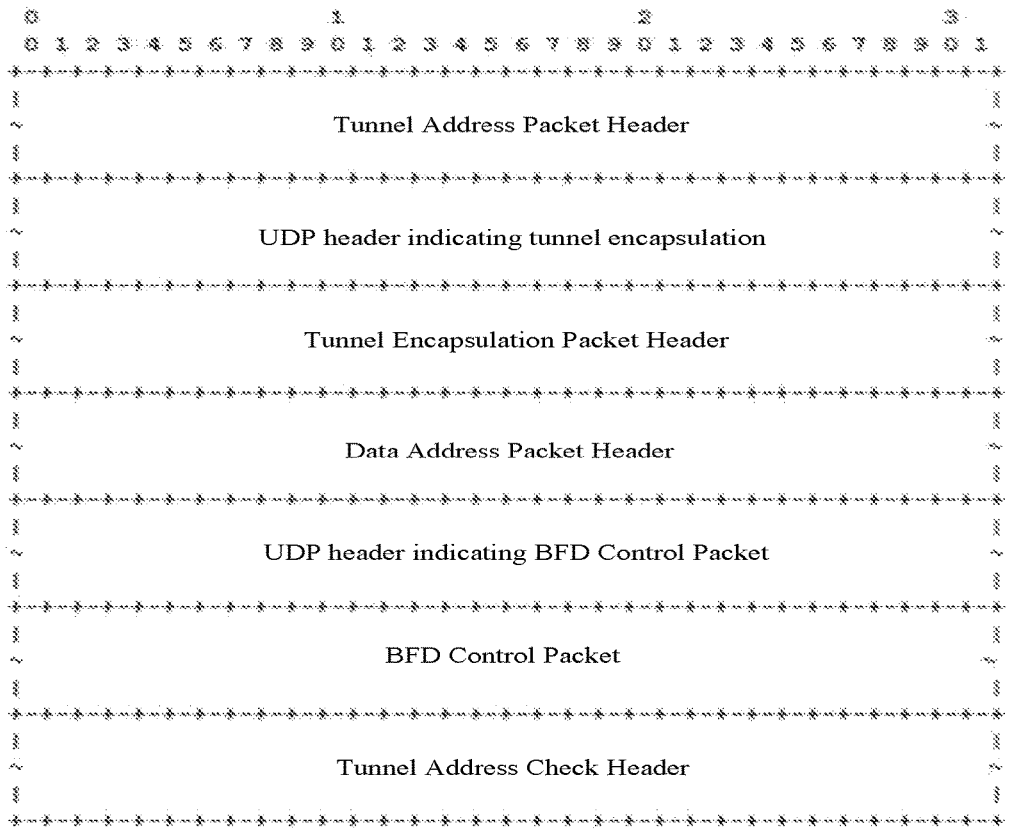

Fig. 8

TUNNEL BFD SESSION ESTABLISHMENT METHOD AND DEVICE

CROSS-REFERENCE TO RELATED APPLICATION

The present disclosure is a National Stage Filing of the PCT International Application No. PCT/CN2021/107713 filed on Jul. 21, 2021, which is based on and claims priority to Chinese patent application 202010753186.3, filed on Jul. 30, 2020 and entitled "Tunnel BFD Session Establishment Method and Device", the disclosure of which is incorporated herein by reference in its entirety.

TECHNICAL FIELD

The embodiments of the present disclosure relate to the field of communications, and in particular, to a tunnel BFD session establishment method and device.

BACKGROUND

An overlay network is a widely applied network type. FIG. 1 is a schematic structural diagram of an overlay network according to the related art. As shown in FIG. 1, the overlay network includes two different types of network nodes, i.e. edge node and intermediate node. Customer equipment is connected to an edge node to access the overlay network. The edge node may add an outer encapsulation to each data packet entering the overlay network, the outer encapsulation including an outer source address and an outer destination address used for forwarding by the intermediate node, wherein the outer source address points to the local edge node which adds the outer encapsulation, and the outer destination address points to a remote edge node. After receiving the data packet to which the outer encapsulation is added, the remote edge node first removes the outer encapsulation from the data packet, and then sends the data packet from which the outer encapsulation has been removed to a customer-side port of the customer equipment connected to the remote edge node.

In the process of implementing an overlay network, one or more tunnels for packet forwarding need to be established between two edge nodes based on customer-side ports connected to the two edge nodes. Generally, for each tunnel, a tunnel bidirectional forwarding detection (BFD) session needs to be enabled for performing connectivity detection on the tunnel. In the related art, the establishment of the described tunnel BFD session generally relies on manual configuration, and as the number of edge nodes in the overlay network of a data center is very large, the manual configuration process not only consumes a large amount of labor and time to perform the configuration operation, but also easily produces configuration errors.

For a series of problems in the related art caused by establishing a tunnel BFD session by means of manual configuration, no effective solution has been proposed in the related art.

SUMMARY

The embodiments of the present disclosure provide a tunnel BFD session establishment method and device, which may at least solve a series of problems in the related art caused by establishing a tunnel BFD session by means of manual configuration.

According to an embodiment of the present disclosure, provided is a tunnel BFD session establishment method. The method is applied to a first edge node, and the method includes:

acquiring first content information, generating a first tunnel bidirectional forwarding detection (BFD) session establishment packet according to the first content information, and sending the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field;

receiving a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field; and establishing a tunnel BFD session between the first edge node and the second edge node when the BFD status of the first edge node and the BFD status of the second edge node are a preset status.

According to another embodiment of the present disclosure, further provided is a tunnel BFD session establishment device. The device is arranged at a first edge node, and the device includes:

a sending module, configured to acquire first content information, generate a first tunnel BFD session establishment packet according to the first content information, and send the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field;

a receiving module, configured to receive a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field; and an establishment module, configured to establish a tunnel BFD session between the first edge node and the second edge node when the BFD status of the first edge node and the BFD status of the second edge node are a preset status.

According to another embodiment of the present disclosure, further provided is a computer-readable storage medium, the computer-readable storage medium storing a computer program, wherein the computer program is configured to execute the operations in any one of the method embodiments at runtime.

According to another embodiment of the present disclosure, further provided is an electronic device, including a memory and a processor, wherein the memory stores a computer program, and the processor is configured to run the computer program so as to execute the operations in any one of the method embodiments.

According to the embodiments of the present disclosure, a first edge node can be enabled to acquire first content information, generate a first tunnel bidirectional forwarding detection (BFD) session establishment packet according to the first content information, and send the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field; and further, the first edge node receives a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field; thus, a tunnel BFD session is established between the first edge node and the second edge node when the BFD status of the first edge node and the BFD status of the second edge node are a preset status. In the embodiments of the present disclosure, a tunnel BFD session between a first edge node and a second edge node can be automatically established without relying on manual operation. Therefore, the embodiments of the present disclosure can solve a series of problems in the related art caused by establishing a tunnel BFD session by means of manual configuration, so as to achieve the effect of automatically establishing the tunnel BFD session.

BRIEF DESCRIPTION OF THE DRAWINGS

FIG. 7 is a flowchart of a tunnel BFD session establishment method according to the embodiments of the present disclosure.

FIG. 8 is a schematic diagram of a format of a first tunnel BFD session establishment packet according to the embodiments of the present disclosure.

DETAILED DESCRIPTION

Hereinafter, the embodiments of the present disclosure will be described in detail with reference to the drawings and in conjunction with the embodiments.

It should be noted that, terms such as "first" and "second" in the description and the claims of the present disclosure and the described drawings are used to distinguish similar objects, but are not necessarily used to describe a specific sequence or order.

To further describe the tunnel BFD session establishment method and device in the embodiments of the present disclosure, the following describes application scenarios of the tunnel BFD session establishment method and device in the embodiments of the present disclosure:

In an overlay network technology, a data center server serving as customer equipment may achieve interconnection by means of an overlay network tunnel established between edge nodes. Generally, the overlay network tunneling protocols involved in the overlay network technology include a virtual extensible local area network (VXLAN) tunneling protocol, a generic protocol extension for VXLAN (VXLAN-GPE) tunneling protocol, and a generic network virtualization encapsulation (Geneve) tunneling protocol. The described three tunneling protocols are indicated by specific user datagram protocol (UDP) destination port numbers.

Figure 1:
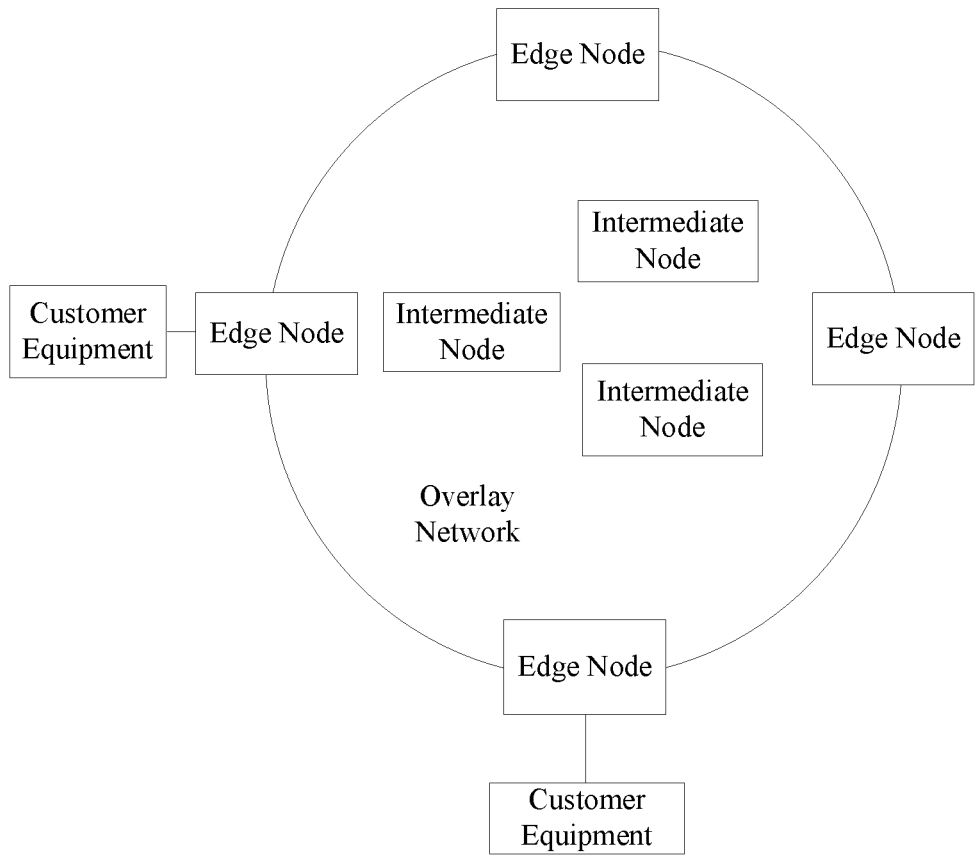
FIG. 1 is a schematic structural diagram of an overlay network according to the related art.
Figure 2:
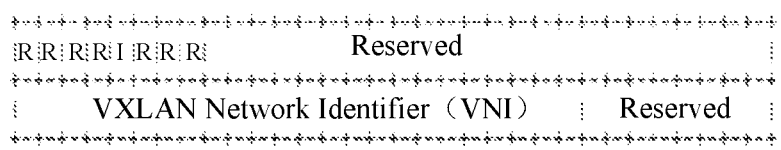
FIG. 2 is a schematic diagram of a format of a VXLAN tunnel encapsulation header according to the embodiments of the present disclosure.
Figure 3:
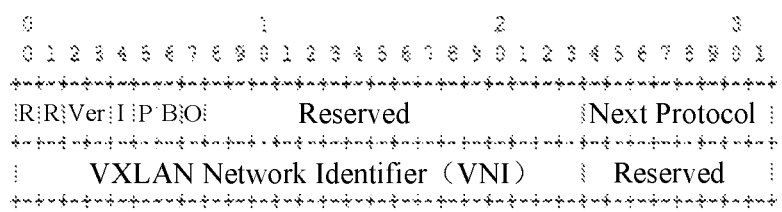
FIG. 3 is a schematic diagram of a format of a VXLAN-GPE tunnel encapsulation header according to the embodiments of the present disclosure.
Figure 4:
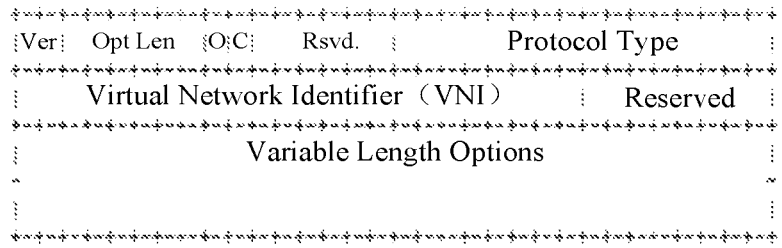
FIG. 4 is a schematic diagram of a format of a Geneve tunnel encapsulation header according to the embodiments of the present disclosure.

In an example, FIG. 2 is a schematic diagram of a format of a VXLAN tunnel encapsulation header according to the embodiments of the present disclosure. As shown in FIG. 2, the VXLAN tunneling protocol may be indicated by a UDP destination port number 4789. FIG. 3 is a schematic diagram of a format of a VXLAN-GPE tunnel encapsulation header according to the embodiments of the present disclosure. As shown in FIG. 3, the VXLAN-GPE tunneling protocol may be indicated by a UDP destination port number 4790. FIG. 4 is a schematic diagram of a format of a Geneve tunnel encapsulation header according to the embodiments of the present disclosure. As shown in FIG. 4, the Geneve tunneling protocol may be indicated by a UDP destination port number 6081. Each of the described three tunnel encapsulation headers carries a virtual network identifier (VNI) used for isolating a virtual network. Meanwhile, the VXLAN-GPE tunnel encapsulation header and the Geneve tunnel encapsulation header further carry a Next Protocol or Protocol Type for indicating a next protocol, and VXLAN does not carry a similar indication field; therefore, the VXLAN-GPE tunneling protocol and the Geneve tunneling protocol can support multiple different types of encapsulation modes, for example, an Ethernet frame encapsulation mode and an Internet Protocol (IP) packet encapsulation mode; and VXLAN can only support an Ethernet frame encapsulation mode.

Generally, for a VXLAN tunnel, a VXLAN-GPE tunnel, and a Geneve tunnel, connectivity detection may be performed by means of the BFD basic protocol. In the process of using the BFD basic protocol for connectivity detection of the VXLAN tunnel, the VXLAN-GPE tunnel, and the Geneve tunnel, a BFD session established on the tunnel may be referred to as a tunnel BFD session.

Figure 5:
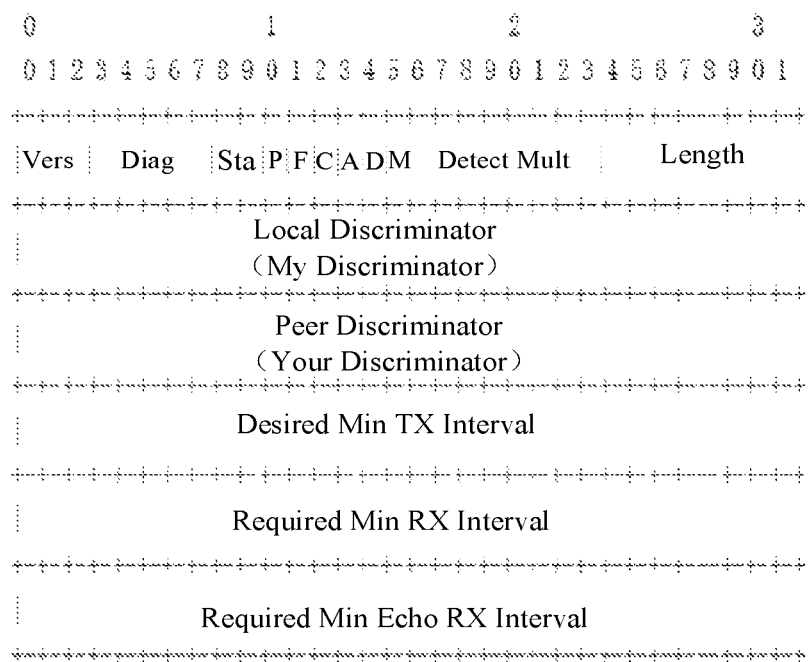
FIG. 5 is a schematic diagram of a format of a BFD control packet according to the embodiments of the present disclosure.

FIG. 5 is a schematic diagram of a format of a BFD control packet according to the embodiments of the present disclosure. The format of the BFD control packet specified by the BFD basic protocol is shown in FIG. 5. In a BFD control packet, a local discriminator My Discriminator and a peer discriminator Your Discriminator are used to identify a BFD session to which the BFD control packet belongs, wherein the former indicates a discriminator configured locally for the BFD session, and the latter indicates a discriminator configured at a peer for the BFD session.

Figure 6:
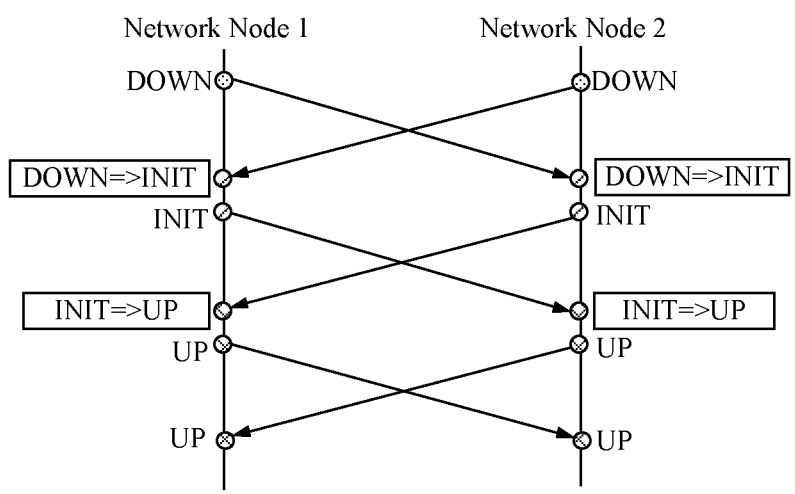
FIG. 6 is a schematic diagram of a BFD session status change according to the embodiments of the present disclosure.

The establishment of a tunnel BFD session generally requires two ends of the session to send three BFD control packets to each other, so as to achieve that the status of the BFD session is changed from DOWN to INIT and then to UP. FIG. 6 is a schematic diagram of a BFD session status change according to the embodiments of the present disclosure. The status change of the BFD session is shown in FIG. 6. Once both ends of the BFD session are in an UP status, it indicates that the BFD session is established successfully. A BFD session generally operates in an asynchronous mode. In this mode, network nodes at two ends of the BFD session periodically send BFD control packets to each other. If one end of the BFD session does not receive a BFD control packet sent by the peer within a certain detection time, it is declared that the BFD session is changed from an UP status to a DOWN status, and subsequent operations such as protection switching may be triggered.

Currently, the establishment and sending of the BFD control packet and the establishment of the tunnel BFD session are all manually configured by management personnel. Among a large number of edge nodes in a data center overlay network, one or more packet forwarding tunnels are established between every two edge nodes based on customer-side ports, and a tunnel BFD session may be enabled for each tunnel; therefore, establishing a BFD session by means of manual configuration not only consumes a large amount of labor and time costs to perform the configuration operation, but also easily produces configuration errors.

To this end, the embodiments of the present disclosure provide a tunnel BFD session establishment method and device, which can automatically establish the tunnel BFD session, thereby significantly improving the efficiency and accuracy of the establishment of the BFD session. The tunnel BFD session establishment method and device in the embodiments of the present disclosure are described below:

In one aspect, the embodiments of the present disclosure provide a tunnel BFD session establishment method, which is applied to a first edge node. FIG. 7 is a flowchart of a tunnel BFD session establishment method according to the embodiments of the present disclosure. As shown in FIG. 7, the tunnel BFD session establishment method in the embodiment of the present disclosure includes operations S102 to S106.

At S102, a first edge network node acquires first content information, generates a first tunnel BFD session establishment packet according to the first content information, and sends the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field;

At S104, the first edge network node receives a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field; and At S106, a tunnel BFD session is established between the first edge node and the second edge node when the BFD status of the first edge node and the BFD status of the second edge node are a preset status.

It should be noted that, in the embodiments of the present disclosure, the first edge node and the second edge node are used to indicate edge nodes on both sides of the tunnel. In the embodiments of the present disclosure, the sequence of operation S102 and operation S104 can be reversed. The sequence of the first edge node generating and sending the first tunnel BFD session establishment packet to the second edge node and the second edge node generating and sending the second tunnel BFD session establishment packet to the first edge node is not limited in the embodiment of the present disclosure. The described process is illustrated below by way of examples:

In an example, the first edge node may first generate a first tunnel BFD session establishment packet according to the first content information, send the first tunnel BFD session establishment packet to the second edge node, and then receive a second tunnel BFD session establishment packet sent by the second edge node. In another example, the first edge node may first receive a second tunnel BFD session establishment packet sent by the second edge node, then generate a first tunnel BFD session establishment packet according to the first content information, and send the first tunnel BFD session establishment packet to the second edge node. In still another example, the first edge node may receive a second tunnel BFD session establishment packet sent by the second edge node, meanwhile generate a first tunnel BFD session establishment packet according to the first content information, and send the first tunnel BFD session establishment packet to the second edge node.

It should be noted that, in the described examples, the edge node that preferentially generates and sends a tunnel BFD session establishment packet to another edge node may also be used as a first edge node, and the corresponding another edge node may also be used as a second edge node.

In the embodiments of the present disclosure, a management entity of a data center network may deliver a tunnel BFD session establishment request to the first edge network node, so as to instruct to establish a tunnel BFD session between the first edge node and the second edge node, that is, before acquiring first content information in operation S102, the first edge network node acquires a tunnel BFD session establishment request for instructing to establish the tunnel BFD session between the first edge node and the second edge node. It should be noted that, the tunnel BFD session establishment request may be sent not only to the first edge node, but also to the second edge node, or simultaneously to the first edge node and the second edge node. This is not limited in the embodiment of the present disclosure.

In another aspect, in the embodiments of the present disclosure, other instruction manner may also be used to instruct to establish a tunnel BFD session between the first edge node and the second edge node, which is not limited in the embodiment of the present disclosure.

The following describes, by means of an exemplary embodiment, the process of the first edge node acquiring first content information after acquiring a tunnel BFD session establishment instruction:

In an exemplary embodiment, in operation S102, acquiring first content information includes:

sending a first request message to the second edge node, so that the second edge node returns a first response message in response to the first request message, wherein the first response message carries the first content information; and acquiring the first content information according to the first response message.

According to the technical solution in the described exemplary embodiment, the first edge node may use the first request message to request the second edge node to return the first response message carrying the first content information, so that the first edge node may acquire the first content information, and then generate and send a first tunnel BFD session establishment packet. It should be noted that the first content information carried in the first response message returned by the second edge node may be determined by the second edge node according to a customer-side port connected to the second edge node. In an exemplary embodiment, the first content information includes at least one of:

a medium access control (MAC) address of a customer-side port connected to the second edge node, an Internet protocol (IP) address of the customer-side port connected to the second edge node, a VNI to which the customer-side port connected to the second edge node belongs, a tunnel encapsulation protocol used by the customer-side port connected to the second edge node, a tunnel encapsulation mode used by the customer-side port connected to the second edge node, and a tunnel BFD session local discriminator configured for the first edge node by the customer-side port connected to the second edge node.

FIG. 8 is a schematic diagram of a format of a first tunnel BFD session establishment packet according to the embodiments of the present disclosure. The encapsulation format of the first tunnel BFD session establishment packet is shown in FIG. 8. As shown in FIG. 8, in the first tunnel BFD session establishment packet, the first BFD status field is encapsulated in the first tunnel BFD session establishment packet, and the first tunnel BFD session establishment packet further includes: a tunnel encapsulation packet header, a data address packet header, a user datagram protocol (UDP) header for indicating tunnel encapsulation, and a peer discriminator;

wherein the tunnel encapsulation packet header is used for carrying the VNI; the data address packet header is used for carrying the MAC address and the IP address; the UDP header for indicating the tunnel encapsulation is used for carrying the tunnel encapsulation protocol; and the peer discriminator is used for carrying the tunnel BFD session local discriminator.

In an exemplary embodiment, in a case where the tunnel encapsulation mode is an Ethernet frame encapsulation mode, the data address packet header is formed by an Ethernet header and an IP header; or in a case where the tunnel encapsulation mode is an IP packet encapsulation mode, the data address packet header is formed by an IP header.

In operation S104, the second edge node may acquire the second content information in various manners. In an exemplary embodiment, the first request message carries the second content information, and the second content information is acquired by the second edge node according to the first request message. In this way, after receiving the first request information sent by the first edge node, the second edge node may acquire the second content information carried in the first request information, then generate the second tunnel BFD session establishment packet according to the second content information, and send same to the first edge node.

In another exemplary embodiment, the second edge node may actively request the first edge node to send the second content information, that is, before receiving the second tunnel BFD session establishment packet sent by the second edge node in operation S104, the method further includes:

receiving a second request message sent by the second edge node, and returning a second response message carrying the second content information to the second edge node according to the second request message, so that the second edge node acquires the second content information according to the second response message.

In this way, after receiving the second request information returned by the first edge node, the second edge node may acquire the second content information carried in the second request information, then generate the second tunnel BFD session establishment packet according to the second content information, and send same to the first edge node. In the described different exemplary embodiments, the second content information has the same composition. In an exemplary embodiment, in operation S102, the second content information includes at least one of:

a MAC address of a customer-side port connected to the first edge node, an IP address of the customer-side port connected to the first edge node, a VNI to which the customer-side port connected to the first edge node belongs, a tunnel encapsulation protocol used by the customer-side port connected to the first edge node, a tunnel encapsulation mode used by the customer-side port connected to the first edge node, and a tunnel BFD session local discriminator configured for the first edge node by the customer-side port connected to the first edge node.

Figure 9:
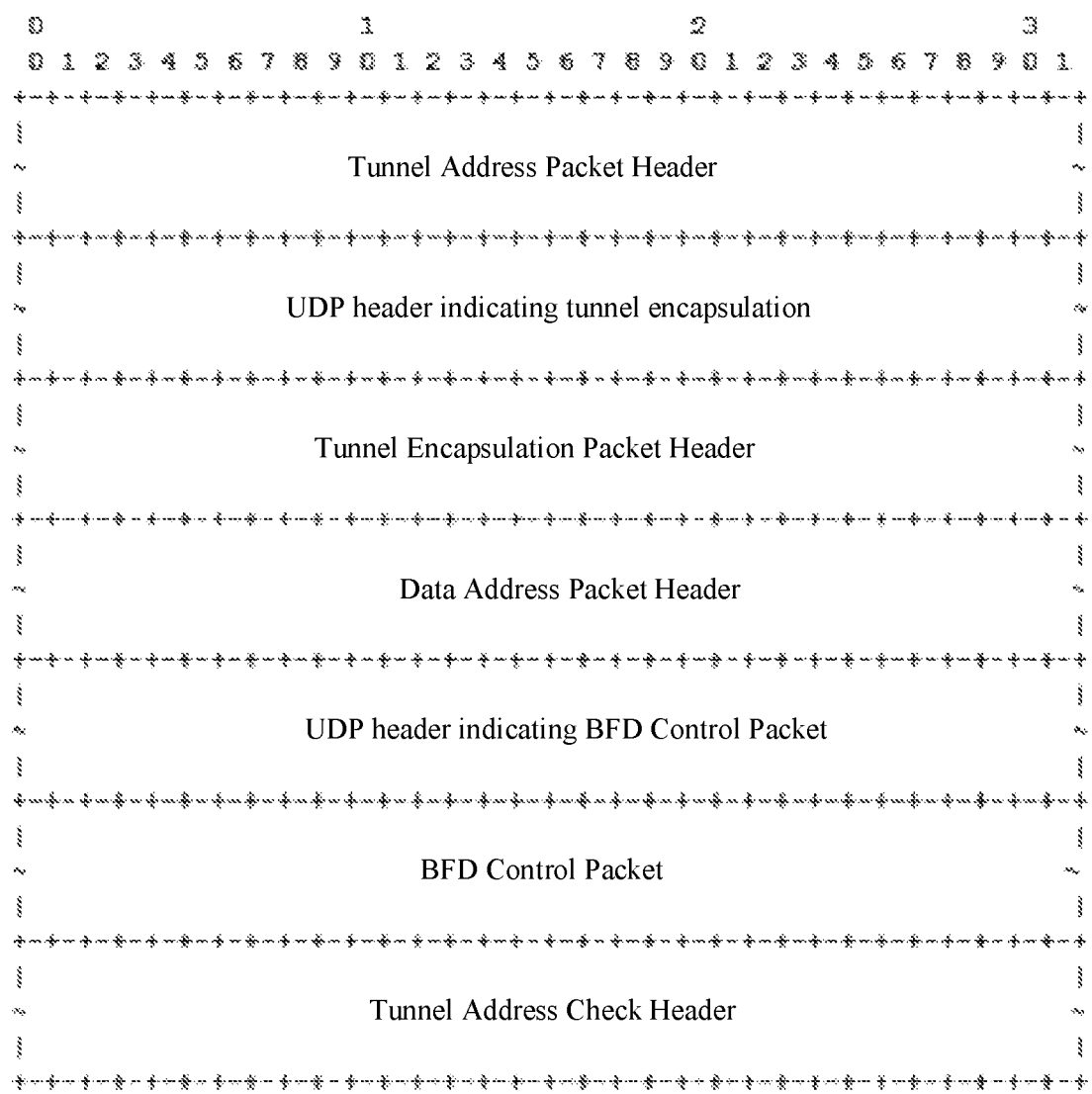
FIG. 9 is a schematic diagram of a format of a second tunnel BFD session establishment packet according to the embodiments of the present disclosure.

FIG. 9 is a schematic diagram of a format of a second tunnel BFD session establishment packet according to the embodiments of the present disclosure. The encapsulation format of the second tunnel BFD session establishment packet is shown in FIG. 9. As shown in FIG. 9, in an exemplary embodiment, the second BFD status field is encapsulated in the second tunnel BFD session establishment packet, and the second tunnel BFD session establishment packet further includes: a tunnel encapsulation packet header, a data address packet header, a UDP header for indicating tunnel encapsulation, and a peer discriminator;

wherein the tunnel encapsulation packet header is used for carrying the VNI; the data address packet header is used for carrying the MAC address and the IP address; the UDP header for indicating the tunnel encapsulation is used for carrying the tunnel encapsulation protocol; and the peer discriminator is used for carrying the tunnel BFD session local discriminator.

In an exemplary embodiment, in a case where the tunnel encapsulation mode is an Ethernet frame encapsulation mode, the data address packet header is formed by an Ethernet header and an IP header; or in a case where the tunnel encapsulation mode is an IP packet encapsulation mode, the data address packet header is formed by an IP header.

The first request message, the first response message, the second request message, and the second response message may be implemented based on different mechanisms or protocols. In an example, the first request message may be generated according to an Internet control message protocol (ICMP) Ping mechanism, and the first response message is generated according to the ICMP Ping mechanism; correspondingly, the second request message is generated according to an Internet control message protocol (ICMP) Ping mechanism, and the second response message is generated according to the ICMP Ping mechanism. In this example, the first tunnel BFD session establishment packet and the second tunnel BFD session establishment packet are packets generated based on the ICMP Ping mechanism.

In another example, the first request message is generated according to an interior gateway protocol (IGP), and the first response message is generated according to the IGP; correspondingly, the second request message is generated according to an interior gateway protocol (IGP), and the second response message is generated according to the IGP. In this example, the first tunnel BFD session establishment packet and the second tunnel BFD session establishment packet are packets generated based on the IGP.

In still another example, the first request message is generated according to a border gateway protocol (BGP), and the first response message is generated according to the BGP; correspondingly, the second request message is generated according to a border gateway protocol (BGP), and the second response message is generated according to the BGP. In this example, the first tunnel BFD session establishment packet and the second tunnel BFD session establishment packet are packets generated based on the BGP.

It should be noted that, establishing the first tunnel BFD session establishment packet and the second tunnel BFD session based on the ICMP Ping mechanism may further precisely control an impact range and timing, for example, specify the establishment time between two edge nodes that need to establish a tunnel BFD session.

In the embodiments of the present disclosure, the first BFD status field in the first tunnel BFD session establishment packet may be determined by the current BFD status of the first edge node, so that after receiving the first tunnel BFD session establishment packet, the second edge node may switch its own BFD status according to the BFD status indicated in the first BFD status field.

Correspondingly, the second BFD status field in the second tunnel BFD session establishment packet may be determined by the current BFD status of the second edge node, so that after receiving the second tunnel BFD session establishment packet, the first edge node may switch its own BFD status according to the BFD status indicated in the second BFD status field. In an exemplary embodiment, after the first edge node switches a BFD status of the first edge node according to the second BFD status field in operation S104, the method further includes:

resending the first tunnel BFD session establishment packet to the second edge node, wherein the first BFD status field in the first tunnel BFD session establishment packet is the current BFD status of the first edge node; and receiving a second tunnel BFD session establishment packet resent by the second edge node, wherein the second BFD status field in the second tunnel BFD session establishment packet is the current BFD status of the second edge node;

wherein the BFD status of the first edge node includes one of: a DOWN status, an INIT status and an Up status; and the BFD status of the second edge node includes one of: a DOWN status, an INIT status and an UP status.

The process of repeatedly sending the first tunnel BFD session establishment packet and the second tunnel BFD session establishment packet is the process of switching the BFD statuses of the first edge node and the second edge node among the DOWN status, the INIT status, and the UP status. The following describes the process in the described embodiment:

At an initial moment, the BFD statuses of the first edge node and the second edge node are both DOWN status; correspondingly, in operation S102, the first BFD status field in the first tunnel BFD session establishment packet (denoted as a first tunnel BFD session establishment packet 01) sent by the first edge node to the second edge node indicates a DOWN status, and after receiving the first tunnel BFD session establishment packet 01, the second edge node switches its own BFD status to an INIT status. Correspondingly, in operation S104, the second BFD status field in the second tunnel BFD session establishment packet (denoted as a second tunnel BFD session establishment packet 01) sent by the second edge node to the first edge node indicates a DOWN status, and after receiving the second tunnel BFD session establishment packet 01, the first edge node switches its own BFD status to an INIT status.

At a first moment, the first edge node repeatedly sends the first tunnel BFD session establishment packet (denoted as a first tunnel BFD session establishment packet 02) to the second edge node, wherein the first BFD status field in the first tunnel BFD session establishment packet 02 indicates the current BFD status of the first edge node, i.e. an INIT status; and after receiving the first tunnel BFD session establishment packet 02, the second edge node switches its own BFD status to an UP status. Correspondingly, the second edge node repeatedly sends the second tunnel BFD session establishment packet (denoted as a second tunnel BFD session establishment packet 02) to the first edge node, wherein the second BFD status field in the second tunnel BFD session establishment packet 02 indicates the current BFD status of the second edge node, i.e. an INIT status; and after receiving the second tunnel BFD session establishment packet 02, the first edge node switches its own BFD status to an UP status.

At a second moment, the first edge node repeatedly sends the first tunnel BFD session establishment packet (denoted as a first tunnel BFD session establishment packet 03) to the second edge node, wherein the first BFD status field in the first tunnel BFD session establishment packet 03 indicates the current BFD status of the first edge node, i.e. an UP status; and after the second edge node receives the first tunnel BFD session establishment packet 02, as its own BFD session status is already the UP status, it can be determined, by means of the first tunnel BFD session establishment packet 03, that the BFD statuses of the first edge node and the second edge node are both the UP status. Correspondingly, the second edge node may also repeatedly send the second tunnel BFD session establishment packet (denoted as a second tunnel BFD session establishment packet 03) to the first edge node, wherein the second BFD status field in the second tunnel BFD session establishment packet 03 indicates the current BFD status of the second edge node, i.e. an UP status; as its own BFD session status is already the UP status, it can be determined, by means of the first tunnel BFD session establishment packet 03, that the BFD statuses of the first edge node and the second edge node are both the UP status.

That the BFD status of the first edge node and the BFD status of the second edge node are both the UP status is the case where the BFD status of the first edge node and the BFD status of the second edge node are a preset status in the embodiments of the present disclosure, so that a tunnel BFD session can be established between the first edge node and the second edge node when the BFD status of the first edge node and the BFD status of the second edge node are both the UP status.

According to the embodiment of the present disclosure, with regard to the first edge node and the second edge node that need to establish a tunnel BFD session, the first edge node in the embodiment of the present disclosure may automatically generate a first tunnel BFD session establishment packet and send same to the second edge node, and accordingly, the second edge node may also automatically generate a second tunnel BFD session establishment packet and send same to the first edge node, so that either of the first edge node and the second edge node can switch the status of the edge node itself by means of a BFD status field carried in the tunnel BFD session establishment packet, and therefore when the BFD statuses of the first edge node and the second edge node reach a preset status, a tunnel BFD session can be established according to the first tunnel BFD session establishment packet and the second tunnel BFD session establishment packet. The described process of establishing the tunnel BFD session does not rely on manual configuration of management personnel, and the tunnel BFD session can be established completely based on automatic interaction between the first edge node and the second edge node; therefore, with regard to a large number of edge nodes in a data center overlay network, the embodiment of the present disclosure can achieve the automatic establishment of a tunnel BFD session between any two edge nodes without manual participation, and therefore the efficiency and accuracy of establishing a tunnel BFD session can be significantly improved, so as to solve the problems in the related art that the production processing efficiency is too low and errors are easily produced caused by establishing a tunnel BFD session by means of manual configuration.

To further describe the tunnel BFD session establishment method in the embodiments of the present disclosure, the following further describes the tunnel BFD session establishment method in the embodiment of the present disclosure by a plurality of exemplary embodiments.

Exemplary Embodiment 1

This exemplary embodiment describes the process of generating a tunnel BFD session establishment packet by an edge node. An edge node 1 in a data center network has one customer-side port Int11, and an edge node 2 has one customer-side port Int21. Ports Int11 and Int21 both use a Geneve tunnel encapsulation protocol and an Ethernet frame encapsulation mode. The VNI to which the ports Int11 and Int21 belong is 10.

S1: A data center network manager sends a command of automatically establishing a tunnel BFD session to an edge node 1, and specifies that a tunnel BFD session needs to be established with an edge node 2.

S2: The edge node 1 sends an ICMP Ping request message to the edge node 2 to request the edge node 2 to return information required for automatically establishing a tunnel BFD session.

S3: After receiving the ICMP Ping request message, the edge node 2 returns to the edge node 1 an ICMP Ping response message carrying the information required for automatically establishing a tunnel BFD session, specifically including the following information:

1) a MAC address and an IP address of a customer-side port Int21 of the edge node 2, and a VNI 10 to which the customer-side port Int21 of the edge node 2 belongs;
2) the tunnel encapsulation protocol used by the customer-side port Int21 of the edge node 2 is Geneve, and the tunnel encapsulation mode used is an Ethernet frame encapsulation mode; and
3) the tunnel BFD session local discriminator configured by the customer-side port Int21 of the edge node 2 for the edge node 1 is Discr2.

S4: After receiving the ICMP Ping response message, the edge node 1 uses the information carried in the message to construct a tunnel BFD session establishment packet.

Figure 10:
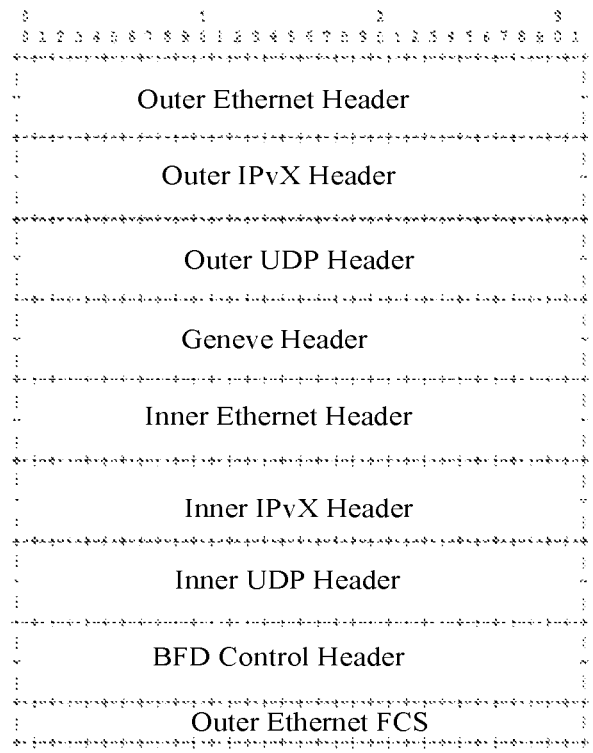
FIG. 10 is a schematic diagram (1) of a format of a BFD session establishment packet according to an exemplary embodiment of the present disclosure.

As the tunnel encapsulation protocol used by Int21 is Geneve, the tunnel encapsulation mode used is an Ethernet frame encapsulation mode. FIG. 10 is a schematic diagram (1) of a format of a BFD session establishment packet according to an exemplary embodiment of the present disclosure. The format of the BFD session establishment packet is shown in FIG. 10, wherein the MAC address and the IP address of Int21, and the VNI 10 to which Int21 belongs are respectively filled with a destination MAC address in an Inner Ethernet Header, a destination IP address of an Inner IPvX Header, and a virtual network identifier of a Geneve Header; and the tunnel BFD session local discriminator Discr2 configured by Int21 for the edge node 1 is filled with a peer discriminator in a BFD Control Packet.

Exemplary Embodiment 2

This exemplary embodiment describes the process of generating a tunnel BFD session establishment packet by an edge node. An edge node 1 in a data center network has two customer-side ports Int11 and Int12, and an edge node 2 has two customer-side ports Int21 and Int22. Ports Int11, Int12, Int21 and Int22 all use a VXLAN-GPE tunnel encapsulation protocol and an IP packet encapsulation mode. The VNI to which the ports Int11 and Int21 belong is 10, and the VNI to which the ports Int12 and Int22 belong is 20.

S1: A data center network manager sends a command of automatically establishing a tunnel BFD session to an edge node 1, and specifies that a tunnel BFD session needs to be established with an edge node 2.

S2: The edge node 1 sends an ICMP Ping request message to the edge node 2 to request the edge node 2 to return information required for automatically establishing a tunnel BFD session.

S3: After receiving the ICMP Ping request message, the edge node 2 returns to the edge node 1 an ICMP Ping response message carrying the information required for automatically establishing a tunnel BFD session, specifically including the following information:

1) a MAC address and an IP address of a customer-side port Int21 of the edge node 2, and a VNI 10 to which the customer-side port Int21 of the edge node 2 belongs, and a MAC address and an IP address of a customer-side port Int22 of the edge node 2, and a VNI 20 to which the customer-side port Int22 of the edge node 2 belongs;
2) the tunnel encapsulation protocol used by the customer-side ports Int21 and Int22 of the edge node 2 is VXLAN-GPE, and the tunnel encapsulation mode used is an IP packet encapsulation mode; and
3) the tunnel BFD session local discriminator configured by the customer-side port Int21 of the edge node 2 for the edge node 1 is Discr21, and the tunnel BFD session local discriminator configured by the customer-side port Int22 of the edge node 2 for the edge node 1 is Discr22.

S4: After receiving the ICMP Ping response message, the edge node 1 uses the information carried in the message to construct a tunnel BFD session establishment packet.

Figure 11:
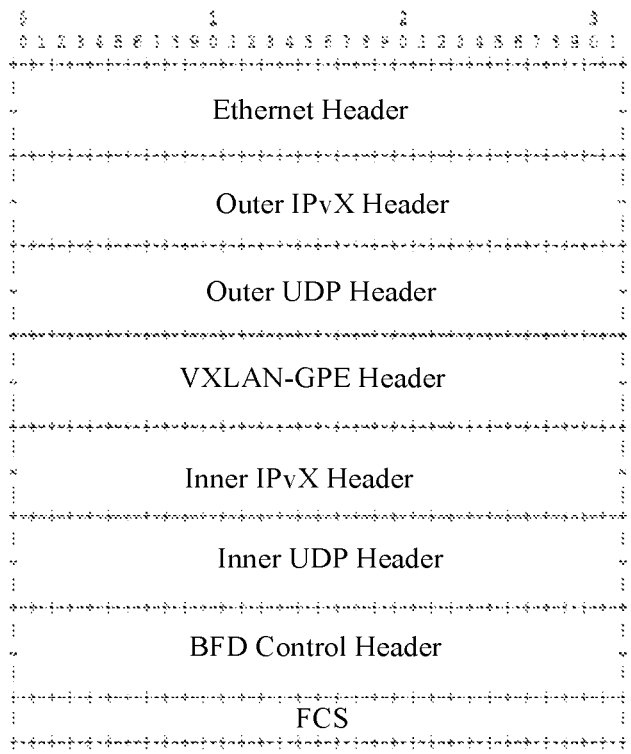
FIG. 11 is a schematic diagram (2) of a format of a BFD session establishment packet according to an exemplary embodiment of the present disclosure.

As the tunnel encapsulation protocol used by Int21 and Int22 is VXLAN-GPE, the tunnel encapsulation mode used is an IP packet encapsulation mode. FIG. 11 is a schematic diagram (2) of a format of a BFD session establishment packet according to an exemplary embodiment of the present disclosure. The format of the BFD session establishment packet is shown in FIG. 11. As the VNI to which Int21 belongs is different from the VNI to which Int22 belongs, a tunnel BFD session establishment packet needs to be constructed respectively for the VNI 10 to which Int21 belongs and the VNI 20 to which Int22 belongs. In a tunnel BFD session establishment packet constructed for VNI 10, the IP address of Int21 and the VNI 10 to which Int21 belongs are respectively filled with a destination IP address in an Inner IPvX Header and a virtual network identifier in a VXLAN-GPE Header; the tunnel BFD session local discriminator Discr21 configured by Int21 for the edge node 1 is filled with a peer discriminator in a BFD Control Packet; in the tunnel BFD session establishment packet constructed for VNI 20, the IP address of Int22 and the VNI 20 to which Int22 belongs are respectively filled with a destination IP address in an Inner IPvX Header and a virtual network identifier in a VXLAN-GPE Header; and the tunnel BFD session local discriminator Discr22 configured by Int22 for the edge node 1 is filled with a peer discriminator in a BFD Control Packet.

Exemplary Embodiment 3

This exemplary embodiment describes the process of establishing a tunnel BFD session by an edge node. An edge node 1 in a data center network has one customer-side port Intl', and an edge node 2 has two customer-side ports Int21 and Int22. Ports Intl', Int21 and Int22 all use a Geneve tunnel encapsulation protocol and an Ethernet frame encapsulation mode. The VNI to which the ports Int11 and Int21 belong is 10, and the VNI to which the port Int22 belongs is 20.

S1: A data center network manager sends a command of automatically establishing a tunnel BFD session to an edge node 1, and specifies that a tunnel BFD session needs to be established with an edge node 2.

S2: The edge node 1 sends an ICMP Ping request message to the edge node 2 to request the edge node 2 to return information required for automatically establishing a tunnel BFD session.

S3: After receiving the ICMP Ping request message, the edge node 2 returns to the edge node 1 an ICMP Ping response message carrying the information required for automatically establishing a tunnel BFD session, specifically including the following information:
1) a MAC address and an IP address of a customer-side port Int21 of the edge node 2, and a VNI 10 to which the customer-side port Int21 of the edge node 2 belongs, and a MAC address and an IP address of a customer-side port Int22 of the edge node 2, and a VNI 20 to which the customer-side port Int22 of the edge node 2 belongs;
2) the tunnel encapsulation protocol used by the customer-side ports Int21 and Int22 of the edge node 2 is Geneve, and the tunnel encapsulation mode used is an Ethernet frame encapsulation mode; and
3) the tunnel BFD session local discriminator configured by the customer-side port Int21 of the edge node 2 for the edge node 1 is Discr21, and the tunnel BFD session local discriminator configured by the customer-side port Int22 of the edge node 2 for the edge node 1 is Discr22.

S4: After receiving the ICMP Ping response message, the edge node 1 uses the information carried in the message to construct a tunnel BFD session establishment packet for the VNI 10. As the edge node 1 does not include a customer-side port belonging to the VNI 20, no tunnel BFD session establishment packet is established for the VNI 20.

S5: The data center network manager sends a command of automatically establishing a tunnel BFD session to the edge node 2, and specifies that a tunnel BFD session needs to be established with the edge node 1.

S6: The edge node 2 sends an ICMP Ping request message to the edge node 1 to request the edge node 1 to return information required for automatically establishing a tunnel BFD session.

S7: After receiving the ICMP Ping request message, the edge node 1 returns to the edge node 2 an ICMP Ping response message carrying the information required for automatically establishing a tunnel BFD session.

S8: After receiving the ICMP Ping response message, the edge node 2 uses the information carried in the message to construct a tunnel BFD session establishment packet for the VNI 10.

S9: For the VNI 10, after the edge node 1 and the edge node 2 send three tunnel BFD session establishment packets to each other, a tunnel BFD session for the VNI 10 can be established.

Exemplary Embodiment 4

This exemplary embodiment describes the process of establishing a tunnel BFD session by an edge node. An edge node 1 in a data center network has one customer-side port Intl', and an edge node 2 has one customer-side port Int21. Ports Int11 and Int21 both use a Geneve tunnel encapsulation protocol and an Ethernet frame encapsulation mode. The VNI to which the ports Int11 and Int21 belong is 10.

S1: A data center network manager sends a command of automatically establishing a tunnel BFD session to an edge node 1, and specifies that a tunnel BFD session needs to be established with an edge node 2.

S2: The edge node 1 sends an ICMP Ping request message to the edge node 2 to request the edge node 2 to return information required for automatically establishing a tunnel BFD session. In addition, the ICMP Ping request message also carries information required by the edge node 2 for automatically establishing a tunnel BFD session, specifically including the following information:
1) a MAC address and an IP address of a customer-side port Int11 of the edge node 1, and a VNI 10 to which the customer-side port Int11 of the edge node 1 belongs;
2) the tunnel encapsulation protocol used by the customer-side port Int11 of the edge node 1 is Geneve, and the tunnel encapsulation mode used is an Ethernet frame encapsulation mode; and
3) the tunnel BFD session local discriminator configured by the customer-side port Int11 of the edge node 1 for the edge node 2 is Discr1.

S3: After receiving the ICMP Ping request message, the edge node 2 returns to the edge node 1 an ICMP Ping response message carrying the information required for automatically establishing a tunnel BFD session, specifically including the following information:

1) a MAC address and an IP address of a customer-side port Int21 of the edge node 2, and a VNI 10 to which the customer-side port Int21 of the edge node 2 belongs;
2) the tunnel encapsulation protocol used by the customer-side port Int21 of the edge node 2 is Geneve, and the tunnel encapsulation mode used is an Ethernet frame encapsulation mode; and
3) the tunnel BFD session local discriminator configured by the customer-side port Int21 of the edge node 2 for the edge node 1 is Discr2.

Figure 12:
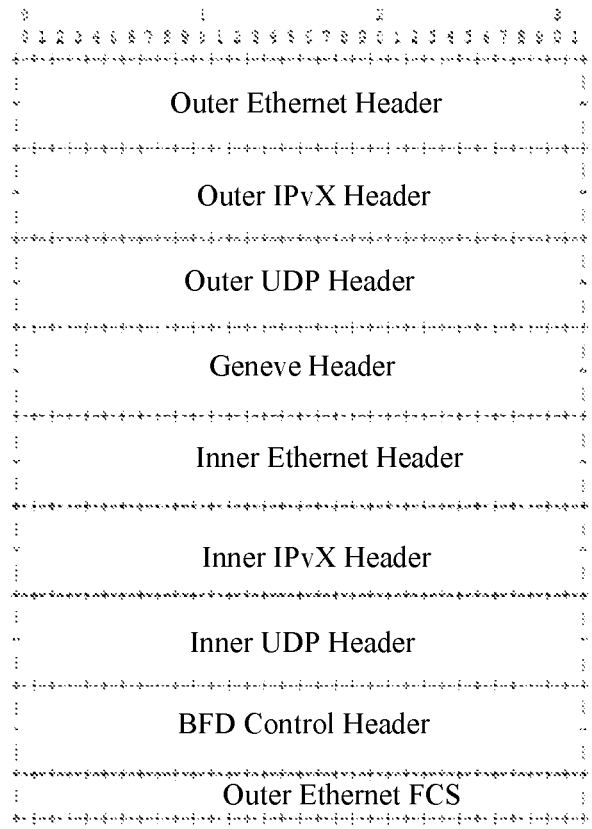
FIG. 12 is a schematic diagram (3) of a format of a BFD session establishment packet according to an exemplary embodiment of the present disclosure.

In addition, the edge node 2 uses the information carried in the received ICMP Ping request message to construct a tunnel BFD session establishment packet. FIG. 12 is a schematic diagram (3) of a format of a BFD session establishment packet according to an exemplary embodiment of the present disclosure. The format of the BFD session establishment packet is shown in FIG. 12, wherein the MAC address and the IP address of Int1', and the VNI 10 to which Int11 belongs are respectively filled with a destination MAC address in an Inner Ethernet Header, a destination IP address in an Inner IPvX Header, and a virtual network identifier in a Geneve Header; and the tunnel BFD session local discriminator Discr1 configured by Int11 for the edge node 2 is filled with a peer discriminator in a BFD Control Packet.

S4: After receiving the ICMP Ping response message returned by the edge node 2, the edge node 1 uses the information carried in the message to construct a tunnel BFD session establishment packet, and the format of the packet is shown in FIG. 9. Wherein the MAC address and the IP address of Int21, and the VNI 10 to which Int21 belongs are respectively filled with a destination MAC address in an Inner Ethernet Header, a destination IP address in an Inner IPvX Header, and a virtual network identifier in a Geneve Header; and the tunnel BFD session local discriminator Discr2 configured by Int21 for the edge node 1 is filled with a peer discriminator in a BFD Control Packet.

S5: After the edge node 1 and the edge node 2 send three tunnel BFD session establishment packets to each other, a tunnel BFD session can be established.

From the description of the foregoing embodiments, a person having ordinary skill in the art may clearly understand that the method according to the described embodiments may be implemented by software and a necessary universal hardware platform, and definitely may also be implemented by hardware. However, in many cases, the former is a preferred implementation.

Based on such understanding, the technical solutions of the present disclosure essentially or the part contributing to the related art may be embodied in the form of a software product. The computer software product is stored in a storage medium (such as a ROM/RAM, a magnetic disk, or an optical disk), and includes several instructions for causing a terminal device (which may be a mobile phone, a computer, a server, or a network device) to execute the method described in the embodiments of the present disclosure.

In another aspect, the embodiments of the present disclosure further provide a tunnel BFD session establishment device, which is arranged at a first edge node. The device is configured to implement the described embodiments and example implementations, and details are not described herein again. The term "module", as used hereinafter, is a combination of software and/or hardware capable of realizing a predetermined function. Although the device described in the following embodiment is preferably implemented by software, implementation by hardware or a combination of software and hardware is also possible and conceived.

Figure 13:
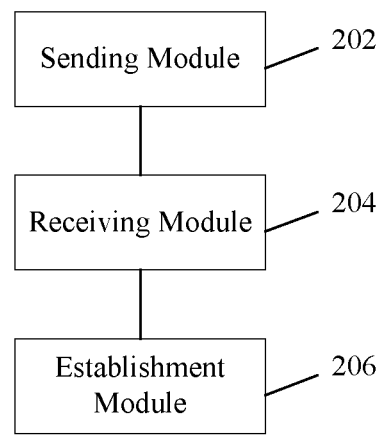
FIG. 13 is a flowchart of a tunnel BFD session establishment device according to the embodiments of the present disclosure.

FIG. 13 is a structural block diagram of a tunnel BFD session establishment device according to the embodiments of the present disclosure. As shown in FIG. 13, the tunnel BFD session establishment device in the embodiment of the present disclosure includes:

a sending module 202, configured to acquire first content information, generate a first tunnel BFD session establishment packet according to the first content information, and send the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field;

a receiving module 204, configured to receive a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field; and an establishment module 206, configured to establish a tunnel BFD session between the first edge node and the second edge node when the BFD status of the first edge node and the BFD status of the second edge node are a preset status.

It should be noted that, other optional solutions of the tunnel BFD session establishment device in the embodiment of the present disclosure and the technical effects thereof correspond to that of the described tunnel BFD session establishment method, and are not further described herein.

In an exemplary embodiment, acquiring first content information includes:

sending a first request message to the second edge node, so that the second edge node returns a first response message in response to the first request message, wherein the first response message carries the first content information; and acquiring the first content information according to the first response message.

In an exemplary embodiment, the first content information includes at least one of:

a medium access control (MAC) address of a customer-side port connected to the second edge node, an Internet protocol (IP) address of the customer-side port connected to the second edge node, a virtual network identifier (VNI) to which the customer-side port connected to the second edge node belongs, a tunnel encapsulation protocol used by the customer-side port connected to the second edge node, a tunnel encapsulation mode used by the customer-side port connected to the second edge node, and a tunnel BFD session local discriminator configured for the first edge node by the customer-side port connected to the second edge node.

In an exemplary embodiment, the first BFD status field is encapsulated in the first tunnel BFD session establishment packet, and the first tunnel BFD session establishment packet further includes: a tunnel encapsulation packet header, a data address packet header, a user datagram protocol (UDP) header for indicating tunnel encapsulation, and a peer discriminator;

wherein the tunnel encapsulation packet header is used for carrying the VNI; the data address packet header is used for carrying the MAC address and the IP address; the UDP header for indicating the tunnel encapsulation is used for carrying the tunnel encapsulation protocol; and the peer discriminator is used for carrying the tunnel BFD session local discriminator.

In an exemplary embodiment, in a case where the tunnel encapsulation mode is an Ethernet frame encapsulation mode, the data address packet header is formed by an Ethernet header and an IP header; or in a case where the tunnel encapsulation mode is an IP packet encapsulation mode, the data address packet header is formed by an IP header.

In an exemplary embodiment, the first request message carries the second content information, and the second content information is acquired by the second edge node according to the first request message.

In an example embodiment, before receiving a second tunnel BFD session establishment packet sent by the second edge node, the method further includes:

receiving a second request message sent by the second edge node, and returning a second response message carrying the second content information to the second edge node according to the second request message, so that the second edge node acquires the second content information according to the second response message.

In an exemplary embodiment, the second content information includes at least one of:

a MAC address of a client-side port connected to the first edge node, an IP address of the client-side port connected to the first edge node, a VNI to which the client-side port connected to the first edge node belongs, a tunnel encapsulation protocol used by the client-side port connected to the first edge node, a tunnel encapsulation mode used by the client-side port connected to the first edge node, and a tunnel BFD session local discriminator configured by the client-side port connected to the first edge node for the first edge node.

In an exemplary embodiment, the second BFD status field is encapsulated in the second tunnel BFD session establishment packet, and the second tunnel BFD session establishment packet further includes: a tunnel encapsulation packet header, a data address packet header, a UDP header for indicating tunnel encapsulation, and a peer discriminator;

wherein the tunnel encapsulation packet header is used for carrying the VNI; the data address packet header is used for carrying the MAC address and the IP address; the UDP header for indicating the tunnel encapsulation is used for carrying the tunnel encapsulation protocol; and the peer discriminator is used for carrying the tunnel BFD session local discriminator.

In an exemplary embodiment, in a case where the tunnel encapsulation mode is an Ethernet frame encapsulation mode, the data address packet header is formed by an Ethernet header and an IP header; or in a case where the tunnel encapsulation mode is an IP packet encapsulation mode, the data address packet header is formed by an IP header.

In an exemplary embodiment, the first request message is generated according to an Internet control message protocol (ICMP) Ping, and the first response message is generated according to the ICMP Ping; or the first request message is generated according to an interior gateway protocol (IGP), and the first response message is generated according to the IGP; or the first request message is generated according to a border gateway protocol (BGP), and the first response message is generated according to the BGP.

In an exemplary embodiment, the second request message is generated according to an Internet control message protocol (ICMP) Ping, and the second response message is generated according to the ICMP Ping; or the second request message is generated according to an interior gateway protocol (IGP), and the second response message is generated according to the IGP; or the second request message is generated according to a border gateway protocol (BGP), and the second response message is generated according to the BGP.

In an example embodiment, before acquiring first content information, the method further includes:

acquiring a tunnel BFD session establishment request, wherein the tunnel BFD session establishment request is used for instructing to establish the tunnel BFD session between the first edge node and the second edge node.

In an example embodiment, after the first edge node switches a BFD status of the first edge node according to the second BFD status field, the method further includes:

resending the first tunnel BFD session establishment packet to the second edge node, wherein the first BFD status field in the first tunnel BFD session establishment packet is the current BFD status of the first edge node; and receiving a second tunnel BFD session establishment packet resent by the second edge node, wherein the second BFD status field in the second tunnel BFD session establishment packet is the current BFD status of the second edge node;

wherein the BFD status of the first edge node includes one of: a DOWN status, an INIT status and an Up status; and the BFD status of the second edge node includes one of: a DOWN status, an INIT status and an UP status.

In an example embodiment, establishing a tunnel BFD session between the first edge node and the second edge node when the BFD status of the first edge node and the BFD status of the second edge node are a preset status further includes:

establishing the tunnel BFD session between the first edge node and the second edge node when the BFD status of the first edge node and the BFD status of the second edge node are both the UP status.

It should be noted that the described various module may be implemented by software or hardware. The latter may be implemented in the following manner, but is not limited thereto: all the modules are located in the same processor; or the various modules are located in different processors in arbitrary combinations.

In another aspect, the embodiments of the present disclosure further provide a computer-readable storage medium, the computer-readable storage medium storing a computer program, wherein the computer program is configured to execute the operations in any one of the described method embodiments at runtime.

In an exemplary embodiment, the computer-readable storage medium may include, but is not limited to, any medium that can store a computer program, such as a USB flash disk, a read-only memory (ROM), a random access memory (RAM), a mobile hard disk, a magnetic disk, or an optical disk.

In another aspect, the embodiments of the present disclosure further provide an electronic device, including a memory and a processor, wherein the memory stores a computer program, and the processor is configured to run the computer program so as to execute the operations in any of the described method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the described embodiments and exemplary implementations, and details are not repeatedly described in this embodiment.

Obviously, those having ordinary skill in the art should understand that various modules or various operations of the present disclosure can be implemented by a universal computing device, and the various modules or operations can be integrated on a single computing device or distributed over a network formed by a plurality of computing devices, and can be implemented by program codes executable by the computing device, so that the modules or operations can be stored in a storage device and executed by the computing device, and the shown or described operations can be executed in sequences different from those described here in some cases, or the various modules or operations can be implemented by manufacturing the modules or operations into various integrated circuit modules respectively, or manufacturing multiple modules or operations among the various modules or operations into a single integrated circuit module. Thus, the present disclosure is not limited to any specific combination of hardware and software.

The above description is only the exemplary embodiments of the present disclosure, and is not intended to limit the present disclosure. For those having ordinary skill in the art, the present disclosure may have various modifications and variations. Any modifications, equivalent replacements, improvements and the like made within the principle of the present disclosure shall belong to the protection scope of the present disclosure.

INDUSTRIAL APPLICABILITY

A first edge node can be enabled to acquire first content information, generate a first tunnel bidirectional forwarding detection (BFD) session establishment packet according to the first content information, and send the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field; and further, the first edge node receives a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field; thus, a tunnel BFD session is established between the first edge node and the second edge node when the BFD status of the first edge node and the BFD status of the second edge node are a preset status. In the embodiments of the present disclosure, a tunnel BFD session between a first edge node and a second edge node can be automatically established without relying on manual operation. Therefore, the embodiments of the present disclosure can solve a series of problems in the related art caused by establishing a tunnel BFD session by means of manual configuration, so as to achieve the effect of automatically establishing the tunnel BFD session.

What is claimed is:

1. A tunnel bidirectional forwarding detection (BFD) session establishment method, which is applied to a first edge node, wherein the method comprises:

acquiring first content information, generating a first tunnel BFD session establishment packet according to the first content information, and sending the first tunnel BFD session establishment packet to a second edge node, wherein the first tunnel BFD session establishment packet carries a first BFD status field, and the first BFD status field is used for instructing the second edge node to switch a BFD status of the second edge node according to the first BFD status field;

receiving a second tunnel BFD session establishment packet sent by the second edge node, wherein the second tunnel BFD session establishment packet is generated by the second edge node according to pre-acquired second content information, the second tunnel BFD session establishment packet carries a second BFD status field, and the second BFD status field is used for instructing the first edge node to switch a BFD status of the first edge node according to the second BFD status field; and establishing a tunnel BFD session between the first edge node and the second edge node when the BFD status of the first edge node and the BFD status of the second edge node are a preset status;

wherein acquiring first content information comprises:

sending a first request message to the second edge node, so that the second edge node returns a first response message in response to the first request message, wherein the first response message carries the first content information; and acquiring the first content information according to the first response message;

wherein the first request message is generated according to an Internet control message protocol (ICMP) Ping, and the first response message is generated according to the ICMP Ping; or the first request message is generated according to an interior gateway protocol (IGP), and the first response message is generated according to the IGP; or the first request message is generated according to a border gateway protocol (BGP), and the first response message is generated according to the BGP.

2. The method according to claim 1, wherein the first content information comprises at least one of:

a medium access control (MAC) address of a customer-side port connected to the second edge node, an Internet protocol (IP) address of the customer-side port connected to the second edge node, a virtual network identifier (VNI) to which the customer-side port connected to the second edge node belongs, a tunnel encapsulation protocol used by the customer-side port connected to the second edge node, a tunnel encapsulation mode used by the customer-side port connected to the second edge node, and a tunnel BFD session local discriminator configured for the first edge node by the customer-side port connected to the second edge node.

3. The method according to claim 2, wherein the first BFD status field is encapsulated in the first tunnel BFD session establishment packet, and the first tunnel BFD session establishment packet further comprises: a tunnel encapsulation packet header, a data address packet header, a user datagram protocol (UDP) header for indicating tunnel encapsulation, and a peer discriminator;

wherein the tunnel encapsulation packet header is used for carrying the VNI; the data address packet header is used for carrying the MAC address and the IP address; the UDP header for indicating the tunnel encapsulation is used for carrying the tunnel encapsulation protocol; and the peer discriminator is used for carrying the tunnel BFD session local discriminator.

4. The method according to claim 3, wherein in a case where the tunnel encapsulation mode is an Ethernet frame encapsulation mode, the data address packet header is formed by an Ethernet header and an IP header; or in a case where the tunnel encapsulation mode is an IP packet encapsulation mode, the data address packet header is formed by an IP header.

5. The method according to claim 1, wherein the first request message carries the second content information, and the second content information is acquired by the second edge node according to the first request message.

6. The method according to claim 1, wherein before receiving a second tunnel BFD session establishment packet sent by the second edge node, the method further comprises:

receiving a second request message sent by the second edge node, and returning a second response message carrying the second content information to the second edge node according to the second request message, so that the second edge node acquires the second content information according to the second response message.

7. The method according to claim 5, wherein the second content information comprises at least one of:

a medium access control (MAC) address of a customer-side port connected to the first edge node, an Internet protocol (IP) address of the customer-side port connected to the first edge node, a virtual network identifier (VNI) to which the customer-side port connected to the first edge node belongs, a tunnel encapsulation protocol used by the customer-side port connected to the first edge node, a tunnel encapsulation mode used by the customer-side port connected to the first edge node, and a tunnel BFD session local discriminator configured for the first edge node by the customer-side port connected to the first edge node.

8. The method according to claim 7, wherein the second BFD status field is encapsulated in the second tunnel BFD session establishment packet, and the second tunnel BFD session establishment packet further comprises: a tunnel encapsulation packet header, a data address packet header, a user datagram protocol (UDP) header for indicating tunnel encapsulation, and a peer discriminator;

wherein the tunnel encapsulation packet header is used for carrying the VNI; the data address packet header is used for carrying the MAC address and the IP address; the UDP header for indicating the tunnel encapsulation is used for carrying the tunnel encapsulation protocol; and the peer discriminator is used for carrying the tunnel BFD session local discriminator.

9. The method according to claim 8, wherein in a case where the tunnel encapsulation mode is an Ethernet frame encapsulation mode, the data address packet header is formed by an Ethernet header and an IP header; or in a case where the tunnel encapsulation mode is an IP packet encapsulation mode, the data address packet header is formed by an IP header.

10. The method according to claim 6, wherein the second request message is generated according to an Internet control message protocol (ICMP) Ping, and the second response message is generated according to the ICMP Ping; or the second request message is generated according to an interior gateway protocol (IGP), and the second response message is generated according to the IGP; or the second request message is generated according to a border gateway protocol (BGP), and the second response message is generated according to the BGP.

11. The method according to claim 1, wherein before acquiring first content information, the method further comprises:

acquiring a tunnel BFD session establishment request, wherein the tunnel BFD session establishment request is used for instructing to establish the tunnel BFD session between the first edge node and the second edge node.

12. The method according to claim 1, wherein after the first edge node switches a BFD status of the first edge node according to the second BFD status field, the method further comprises:

resending the first tunnel BFD session establishment packet to the second edge node, wherein the first BFD status field in the first tunnel BFD session establishment packet is the current BFD status of the first edge node; and receiving a second tunnel BFD session establishment packet resent by the second edge node, wherein the second BFD status field in the second tunnel BFD session establishment packet is the current BFD status of the second edge node;

wherein the BFD status of the first edge node comprises one of: a DOWN status, an INIT status and an Up status; and the BFD status of the second edge node comprises one of: a DOWN status, an INIT status and an UP status.

13. The method according to claim 12, wherein establishing a tunnel BFD session between the first edge node and the second edge node when the BFD status of the first edge node and the BFD status of the second edge node are a preset status further comprises:

establishing the tunnel BFD session between the first edge node and the second edge node when the BFD status of the first edge node and the BFD status of the second edge node are both the UP status.

14. A non-transitory computer-readable storage medium, the computer-readable storage medium storing a computer program, wherein the computer program is configured to execute the method according to claim 1 at runtime.

15. An electronic device, comprising a memory and a processor, wherein the memory stores a computer program, and the processor is configured to run the computer program so as to execute the method according to claim 1.

16. The method according to claim 6, wherein the second content information comprises at least one of:

a medium access control (MAC) address of a customer-side port connected to the first edge node, an Internet protocol (IP) address of the customer-side port connected to the first edge node, a virtual network identifier (VNI) to which the customer-side port connected to the first edge node belongs, a tunnel encapsulation protocol used by the customer-side port connected to the first edge node, a tunnel encapsulation mode used by the customer-side port connected to the first edge node, and a tunnel BFD session local discriminator configured for the first edge node by the customer-side port connected to the first edge node.

17. The method according to claim 16, wherein the second BFD status field is encapsulated in the second tunnel BFD session establishment packet, and the second tunnel BFD session establishment packet further comprises: a tunnel encapsulation packet header, a data address packet header, a user datagram protocol (UDP) header for indicating tunnel encapsulation, and a peer discriminator;

wherein the tunnel encapsulation packet header is used for carrying the VNI; the data address packet header is used for carrying the MAC address and the IP address; the UDP header for indicating the tunnel encapsulation is used for carrying the tunnel encapsulation protocol; and the peer discriminator is used for carrying the tunnel BFD session local discriminator.

18. The method according to claim 17, wherein in a case where the tunnel encapsulation mode is an Ethernet frame encapsulation mode, the data address packet header is formed by an Ethernet header and an IP header; or in a case where the tunnel encapsulation mode is an IP packet encapsulation mode, the data address packet header is formed by an IP header.

\* \* \* \* \*